United States Patent [19]
Fotino et al.

[11] Patent Number: 5,901,947
[45] Date of Patent: May 11, 1999

[54] ONE PIECE BUMPER-BELLOWS SUBASSEMBLY

[75] Inventors: William A. Fotino, Upper Saddle River, N.J.; Brian P. Hopkins, New Rochelle, N.Y.

[73] Assignee: North American Parts Distributors Inc., Mahwah, N.J.

[21] Appl. No.: 08/819,493

[22] Filed: Mar. 17, 1997

Related U.S. Application Data

[63] Continuation of application No. 08/485,251, Jun. 7, 1995, abandoned.

[51] Int. Cl.$^6$ .................................................. B60G 13/00
[52] U.S. Cl. ............................ 267/220; 267/195; 267/33; 267/225; 280/668
[58] Field of Search ................................ 267/33, 34, 220, 267/221, 140, 140.4, 122; 280/668, 673, 692, 696, 701, 724; 188/322.12

[56] References Cited

U.S. PATENT DOCUMENTS

| | | | |
|---|---|---|---|
| 4,042,259 | 8/1977 | Fiedler et al. | 280/701 |
| 4,256,292 | 3/1981 | Sullivan, Jr. et al. | 267/8 R |
| 4,260,176 | 4/1981 | Pacis et al. | 280/668 |
| 4,260,177 | 4/1981 | Pflughaupt et al. | 280/668 |
| 4,462,608 | 7/1984 | Lederman | 280/668 |
| 4,618,127 | 10/1986 | Le Salver et al. | 267/8 R |
| 4,681,304 | 7/1987 | Hassan | 267/8 R |
| 4,690,425 | 9/1987 | Kanji Kubo | 280/668 |
| 4,711,463 | 12/1987 | Knable et al. | 280/668 |
| 4,721,325 | 1/1988 | Mackovjak et al. | 280/668 |
| 4,747,587 | 5/1988 | Ferrel | 267/220 |
| 4,771,996 | 9/1988 | Martinez, Jr. et al. | 267/220 |
| 4,779,855 | 10/1988 | Tanaka | 267/220 |
| 4,804,169 | 2/1989 | Hassan | 267/220 |
| 4,805,886 | 2/1989 | Hassan | 267/220 |
| 4,817,928 | 4/1989 | Paton | 267/219 |
| 4,969,542 | 11/1990 | Athmer et al. | 188/322.12 |
| 5,015,002 | 5/1991 | Goodman et al. | 277/212 FB |
| 5,078,370 | 1/1992 | McClellan | 267/220 |
| 5,120,031 | 6/1992 | Charles et al. | 267/220 |
| 5,133,573 | 7/1992 | Kijima et al. | 267/33 X |
| 5,275,389 | 1/1994 | Pinch et al. | 267/220 |
| 5,308,048 | 5/1994 | Weaver et al. | 267/220 |
| 5,362,035 | 11/1994 | Carter | 267/220 |

*Primary Examiner*—Robert Oberleitner
*Assistant Examiner*—H. S. Sawhney
*Attorney, Agent, or Firm*—Susanne M. Hopkins

[57] ABSTRACT

The present invention is directed to a one piece, integrally molded, bumper-bellows subassembly for use in vehicles, for example, for use in suspension systems, rack and pinion steering systems and airsprings. The present subassembly prevents the elements from entering the bottom of the subassembly and thus eliminates the possibility of damage to the piston rod and seals of the damper. The present subassembly is cost-effective to produce and can be installed quickly and easily. During operation, the present subassembly is stable and is not affected by a severe drop in the suspension.

21 Claims, 8 Drawing Sheets

ONE PIECE BUMPER-BELLOWS SUBASSEMBLY

This application is a continuation of application Ser. No. 08/485,251, filed Jun. 7 1995 now abandoned.

FIELD OF THE INVENTION

The present invention relates to a one piece, integrally molded, bumper-bellows subassembly for use in vehicles, for example, for use in suspension systems, rack and pinion steering systems and airsprings.

BACKGROUND OF THE INVENTION

Dampers (shock absorbers and struts) are used in automobile suspension systems. The telescopic piston rod and seals of a damper must be protected from the elements. Further, the mount assembly, bearing, and damper must be protected from coming in contact with one another during suspension travel.

A jounce bumper is a tubular member that is slipped over the piston rod of the damper. The jounce bumper protects the mount assembly from coming into contact with the striker plate of the damper. The jounce bumper is compressed as a damper bottoms out on a compression or jounce stroke to dissipate jounce energy, thus, protecting the mount assembly.

A bellows (dust shield or sheath) is used to protect the piston rod and seals from the elements. It has a hollow cylindrical body that is slipped over an upper end of the piston rod on the damper. The bellows includes a portion of inner and outer convolutions on the outer surface of the body. Such convolutions provide a spring-like effect by permitting the bellows to be compressed when the damper is in a compression stroke and by causing the bellows to expand to its approximate original length during rebound of the damper.

Prior art products are disadvantageous in that each model of automobile contains a different damper that requires a different bumper/bellows design. As there are well over a 100 different models on the market today, and it is not cost-effective to make 100 separate bumpers and 100 separate bellows to cover each applicable damper.

The most common bellows is an elastic sheath. One end of the sheath is connected to the jounce bumper by way of a metallic strap or interlocking groves, while the other end is open. The connected bumper and bellows is slipped over the piston rod of the damper, where the open end of the sheath allows it to pass over the reservoir tube of the damper during suspension travel.

This two-piece system is disadvantageous in that the open-ended sheath does not prevent the elements from entering the bottom of the unit and damaging the piston rod and seals of the damper. Further, the attachment method for connecting the jounce bumper and dust shield is a mechanical method that uses additional parts (mechanical strap) or interlocking groves to hold the two individual parts together. Time must be taken, and alternate methods must be used to accomplish connecting the two items. Lastly, the multiple part assembly is expensive to manufacture and takes a longer time to produce.

Other systems use a bellows connected to a jounce bumper, through either an interlocking grove or a third part (interlocking ring), on one end, and mechanically attached to the reservoir tube on the other end with a fourth part, i.e., via a tie-strap or clamp.

This system is disadvantageous in that there are three to four separate parts, that require assembly. The connection is also very unstable, for example, a severe drop in the suspension (i.e., driving over a pot-hole) can cause the bumper and bellows to separate, thereby causing the top of the bellows to fall. This in turn causes the exposure of the piston rod and seals to the elements. Further, this multiple part assembly requires the use of a mechanical tie-strap or clamp that may become unattached from the damper, thus causing exposure of the piston rod and seals. There are still two openings on either side of the bellows that allow contamination of the interior. When installing the unit, it is difficult to fit the jounce bumper over the major diameter of the piston rod. Lastly, the multiple part system is more expensive to manufacture and takes a longer time to produce.

In another design, illustrated in U.S. Pat. No. 5,275,389, the jounce bumper uses a collar that "traps" the bellows between the jounce bumper and an upper metal washer. The bellows design in this patent is a combination of a sheath and a bellows. This system is disadvantageous in that the lower end of the bellows that slips over the reservoir tube is open, which exposes the piston rod and seals of the damper to the elements. Further, this multiple part system is more expensive and time-consuming to manufacture.

SUMMARY OF THE INVENTION

The present invention provides an integrally molded, one piece, bumper-bellows subassembly for use in vehicles, for example, in suspension systems, rack and pinion steering systems and in airsprings. This subassembly solves the problems of the prior art devices by providing an integrally molded, one piece, bumper-bellows which prevents the elements from entering the bottom of the subassembly and thus eliminates the possibility of damage to piston rod and seals of the damper. Since the subassembly is one part, manufacture of the subassembly is cost-effective and time-efficient. Installation of the present subassembly is also quick and easy. Since the bumper and bellows are integrally molded, the subassembly is very stable. For example, a severe drop in the suspension (i.e., driving over a pot-hole) will not affect the subassembly. Whereas, in the prior art multiple part assembly such a severe drop in suspension can cause the parts to separate thus exposing the piston rod and seals to the elements. The present jounce bumper portion of the present subassembly is either free-floating in respect to the piston rod or the jounce bumper is frictionally fit to the piston rod (i.e., the diameter of the passageway of the top end portion of the jounce bumper is equal to or less than the diameter of the piston rod).

In general, either the frictional fit or floating fit can be employed in suspension systems where the piston rod itself rotates or in rear strut systems that do not employ a steering system. In systems where the piston rod does not rotate, the present subassembly having a floating fit is preferred to prevent binding of the bellows.

One object of the present invention is to provide an integrally molded one piece bumper-bellows subassembly.

An object of the present invention is to provide an integrally molded, one piece bumper-bellows subassembly where the jounce bumper portion is frictionally fit to the piston rod.

A further object of the present invention is to provide a jounce bumper that installs easily over the piston rod, having a tubular body portion, upper end portion and lower end portion defining a passageway therethrough, and the passageway of the upper end portion defines a top inner edge and a bottom inner edge where the bottom inner edge is convex relative to the passageway (radius on the jounce bumper inner diameter).

A further object of the present invention is to provide an integrally molded elastomeric collar on a bottom edge of the present subassembly, for attaching the subassembly to the reservoir tube of the damper.

An object of the present invention is to provide an integrally molded elastomeric skirt around the elastomeric collar to allow for easy installation.

A further object of the present invention is to provide an integrally molded cinch collar on the bottom edge of the bottom end portion of the bellows for cinching the bellows portion of the subassembly to the reservoir tube of the damper.

An additional object of the present invention is to provide one or more leak detection orifices on the bottom end portion of the bellows portion of the subassembly for indicating damper failure.

An object of the present invention is to provide one or more protection flaps near the leak detection orifices to prevent the elements and debris from contaminating the piston rod and seals.

An object of the present invention is to provide a free-floating integrally molded bumper-bellows subassembly.

A further object of the present invention is to provide a tubular boot on the lower end portion of the free-floating jounce bumper, with the tubular boot in cooperation with the reservoir tube of the damper.

An object of the present invention is to provide one or more leak detection orifices on a bottom end portion of the bellows of the present subassembly.

A further object of the present invention is to provide an integrally molded elastic collar or an integrally molded cinch collar, on a bottom end portion of the bellows of the present subassembly.

DETAILED DESCRIPTION OF THE INVENTION

Figure 1:
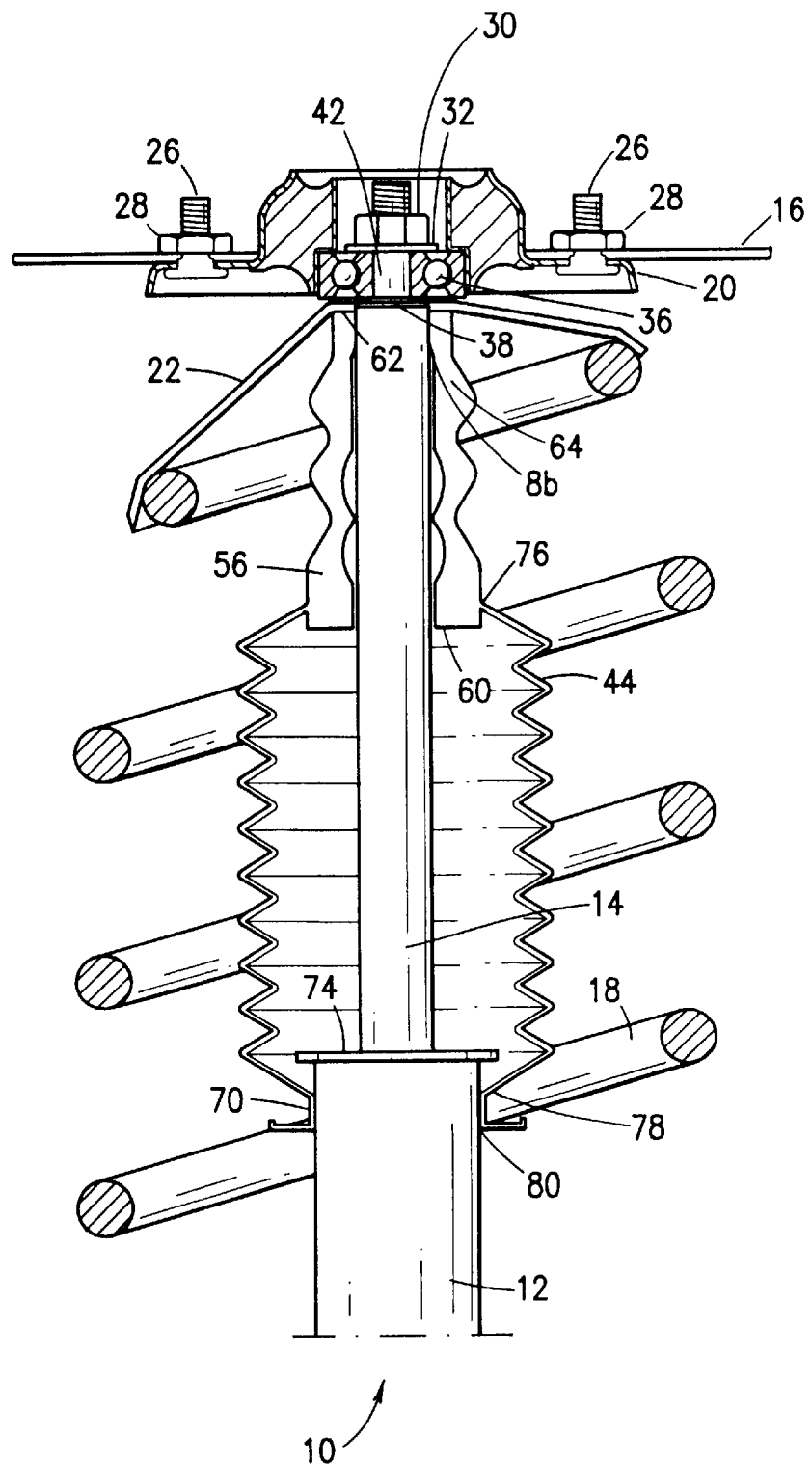
FIG. 1 is a longitudinal sectional view illustrating a preferred embodiment of the present bumper-bellows subassembly where the jounce bumper is frictionally fit to the piston rod, and the subassembly is mounted between a damper and a mount.

A conventional damper is indicated generally at 10 in FIG. 1 and includes a reservoir tube 12 mounting a reciprocating piston rod 14. The damper 10 is mounted between a vehicle wheel assembly (not illustrated) and the upper mount assembly 20. The piston rod is connected to the upper mount assembly 20, and seats itself within the thrust bearing 36. The piston rod 14 has a smaller diameter that fits within the thrust bearing 42, and is then secured to the upper mount assembly 20 by the piston rod nut 30 and washer 32. The piston rod 14 has a upper planer surface 38 which rests on the top of the thrust bearing 36. The upper mount assembly is secured to the vehicle body 16 by several studs 26 and nuts 28. Surrounding the system is a suspension spring 18.

The upper planer surface 62 of the jounce bumper 56 is located between the damper 10 and the spring seat 22, located beneath the upper mount assembly 20. At the top of the jounce bumper there is a radius (convex surface edge relative to the passageway) 86 on the first bottom edge of the inner diameter of the jounce bumper 64 used to ease the jounce bumper 56 over the top planer surface 38 of the piston rod 14. The bellows unit 44 is integrally molded with the jounce bumper 56 at 76. The bellows unit 44 can be molded at any angle relative to the jounce bumper or perpendicular to the jounce bumper. The bellows unit is preferably molded to the jounce bumper at an angle which places no stress on the subassembly during rest, as shown in FIG. 1. The lower planer surface 60 of the jounce bumper 56 comes into contact with the striker plate 74 of the damper 10 on full suspension compression.

At the base (bottom edge) of the bellows unit 44, there is an integrally molded elastic collar 70 and skirt 72, which is used to secure the jounce bumper/bellows subassembly to the reservoir tube 12 of the damper 10, and to provide ease in installation. The diameter 80 of the collar 70 is less than or equal to the diameter of the reservoir tube 12. Above the collar 70 are two orifices 78 used to detect leaks in the case of damper failure. When a strut is damaged or worn, seals may give way and the oil will leak and such leaking oil can be detected by visual inspection.

Figure 2:
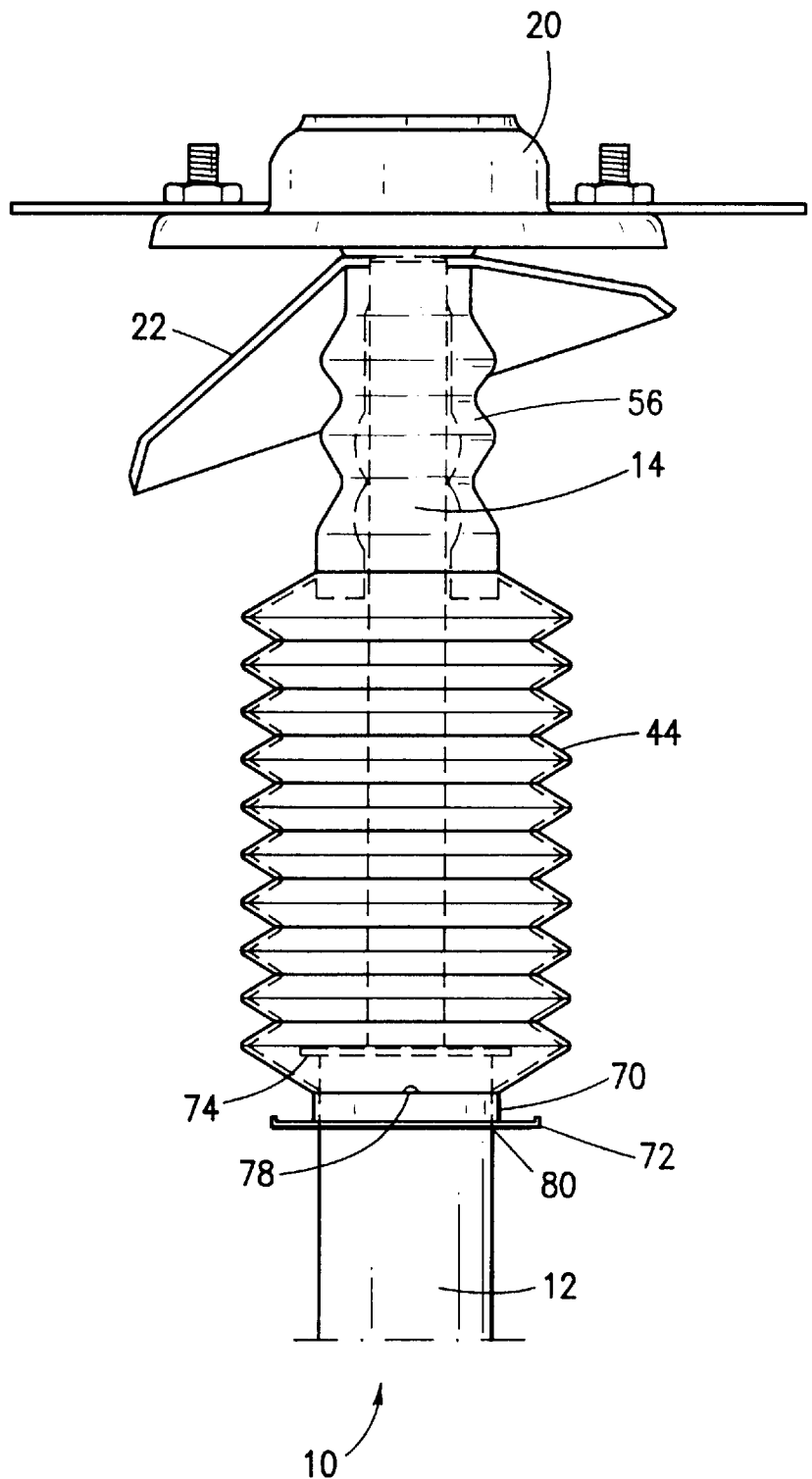
FIG. 2 is a longitudinal view illustrating a preferred embodiment of the present bumper-bellows subassembly having an integrally molded elastomeric collar, where the jounce bumper is frictionally fit to the piston rod.

FIG. 2 is a view using broken lines, and is similar to FIG. 1, absent the suspension spring 18.

Figure 3:
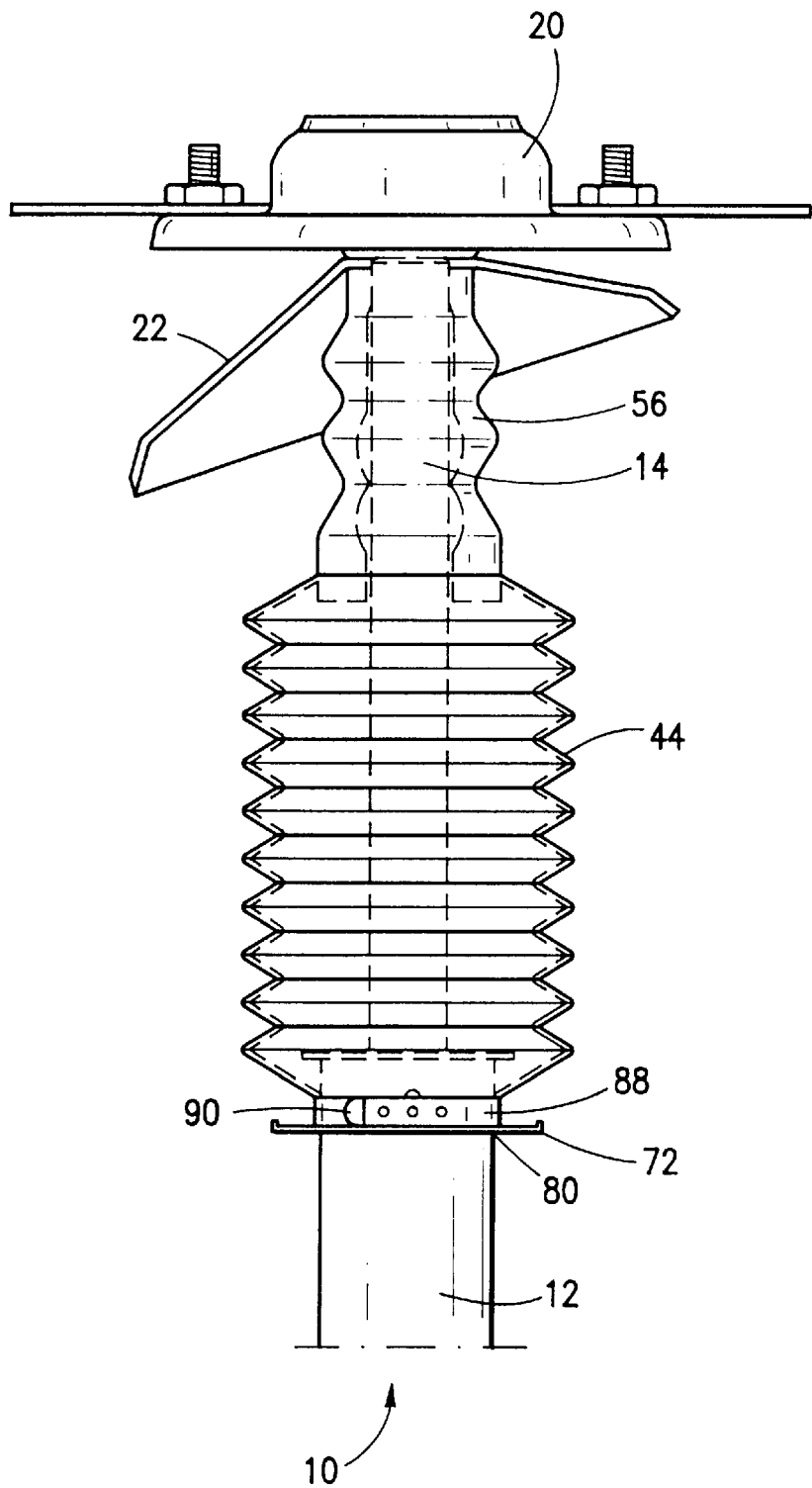
FIG. 3 is a longitudinal view illustrating a preferred embodiment of the present bumper-bellows subassembly having an integrally molded cinch collar, where the jounce bumper is frictionally fit to the piston rod.

FIG. 3 is similar to FIG. 2, and illustrates a preferred embodiment where provided on the bottom end portion of the bellows is an integrally molded cinch collar 88 instead of the elastic collar 70, for securing the jounce bumper/bellows subassembly to the reservoir tube 12 the cinch collar 88 may include an integrally molded elastomeric strap.

Figure 4:
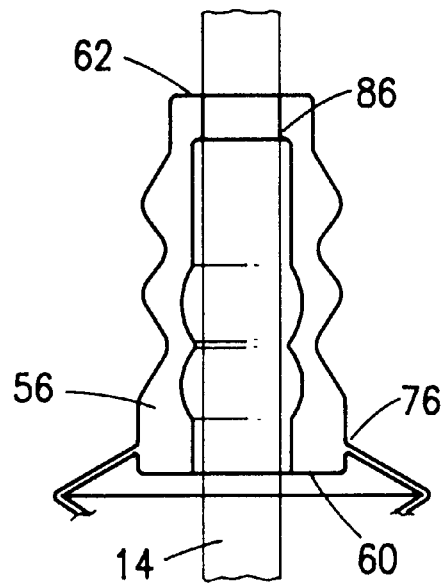
FIG. 4 is a close-up view of the inner-diameter of the jounce bumper portion of the present subassembly, illustrating a preferred embodiment where the first bottom edge of the top end portion of the jounce bumper is curved convex relative to the passageway, where the jounce bumper is frictionally fit to the piston rod.

FIG. 4 is a detailed illustration of upper jounce bumper 56, that shows a top planer surface 62, with radius 86 located on the first bottom edge on inner diameter 84. The bellows portion (not illustrated) is integrally molded with the jounce bumper 56 at 76.

Figure 5:
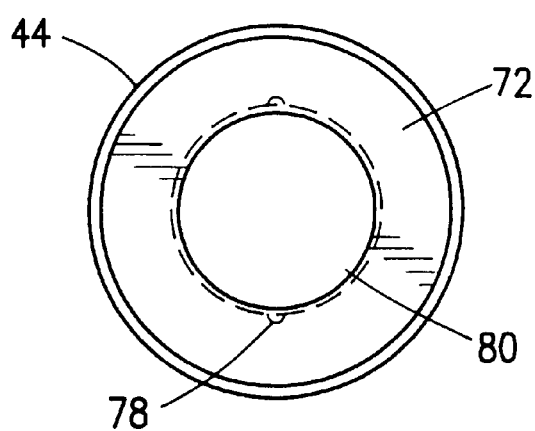
FIG. 5 is a view of the bottom of the bellows portion of the present subassembly, illustrating a preferred embodiment where the subassembly includes an integrally molded elastomeric collar and skirt.

FIG. 5 is a bottom view of a preferred embodiment, giving the straight on view of the elastic collar 70 having internal diameter 80, of the bellows which attaches to the reservoir tube (not shown) of the damper (not shown). Broken lines detail the leak detection orifices 78 and the outer convolutions of the bellows 44. Lastly, the lower skirt 72 is illustrated, which is integrally molded to the jounce bumper/bellows assembly.

Figure 6:
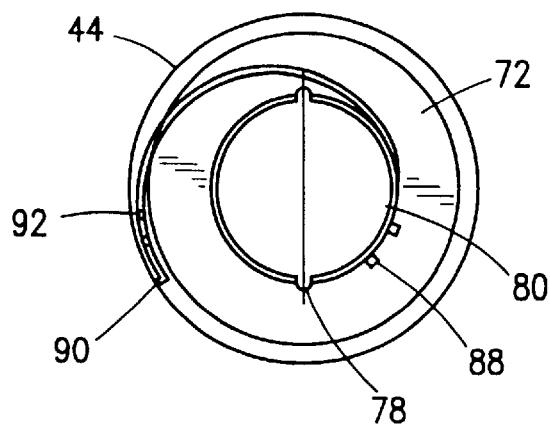
FIG. 6 is a view of the bottom of the bellows portion of the present subassembly, illustrating a preferred embodiment where the subassembly includes an integrally molded cinch collar and tabs. The solid line running through the center of the figure represents points of discontinuity where the line intersects the cinch collar.

FIG. 6 is also a bottom view of a preferred embodiment, giving the straight on view of the cinch collar 88 having an internal diameter 80, of the bellows which attaches to the reservoir tube (not shown) of the damper (not shown). Leak detection orifices 78 and the outer convolutions of the bellows 44 are illustrated. The lower skirt 72 is pictured, which is integrally molded to the jounce bumper/bellows assembly. Integrally molded to the base are cinch tabs 90 used to lock the cinching tab openings 92 located on the cinching device 88.

Figure 7:
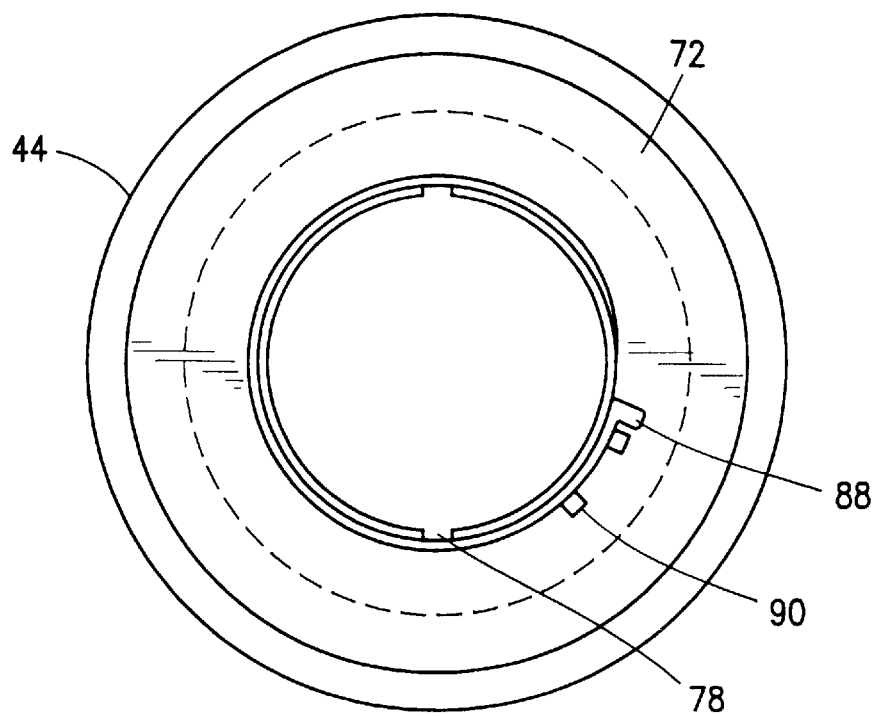
FIG. 7 is a close-up view of the bottom of the bellows portion of the present subassembly, illustrating a preferred embodiment where the cinch collar and tabs are in the locking position.

FIG. 7 is a close-up view of the bottom of the bellows portion illustrating the cinch collar 88 in a locked position on the cinching tabs 90.

Figure 8:
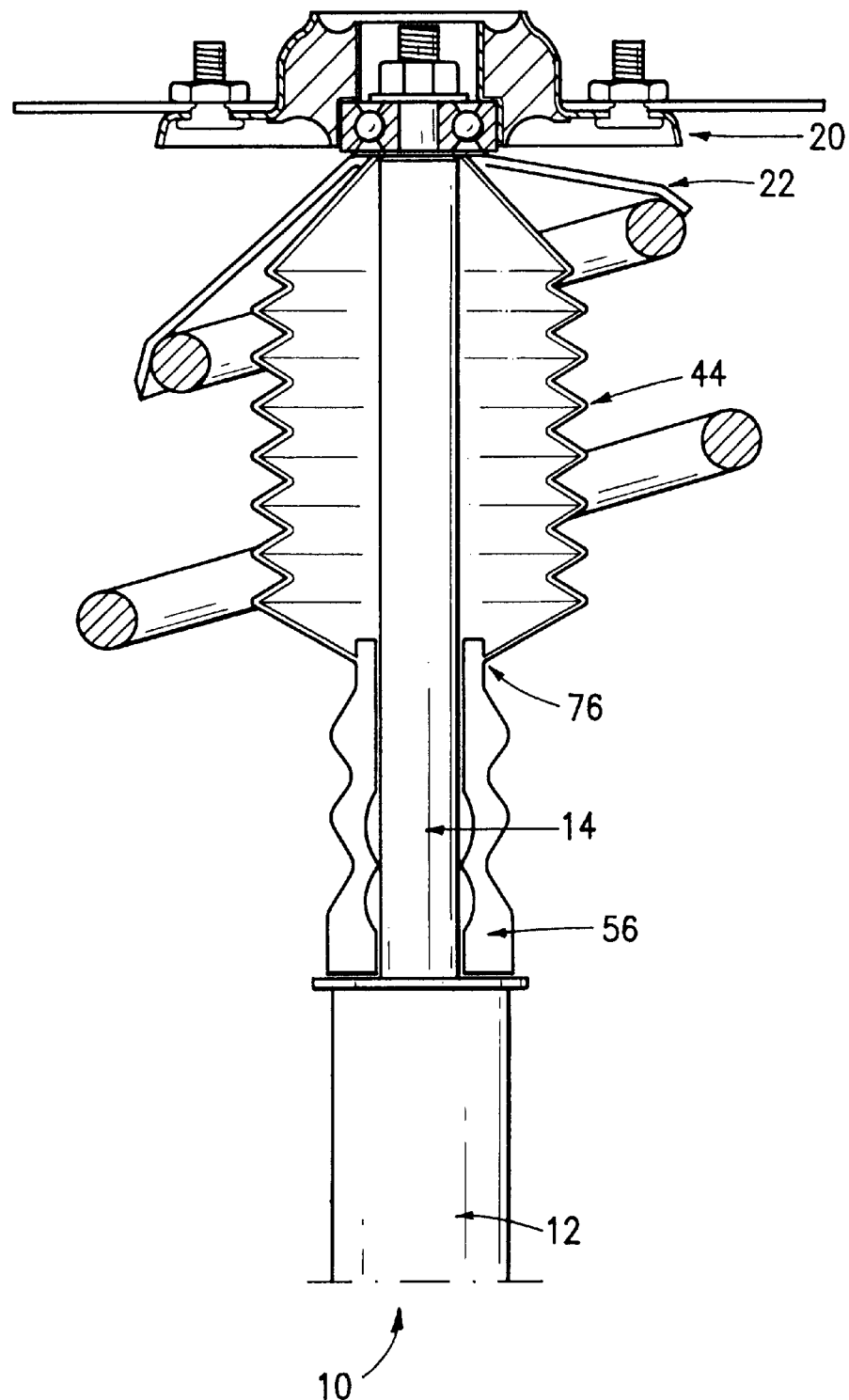
FIG. 8 is a longitudinal sectional view of the present subassembly, where the subassembly including the jounce bumper is free-floating, illustrating an embodiment where the upper end portion of the jounce bumper is integrally molded to the bottom end portion of the bellows, where the subassembly is mounted between a damper and a mount such that the top portion of the bellows is in cooperation with the mount and the lower end portion of the jounce bumper is in cooperation with the reservoir tube of the damper.

FIG. 8 shows a longitudinal sectional view of the present subassembly where the jounce bumper 56 is free-floating in relation to piston rod 14. The bellows unit 44 is integrally molded with the jounce bumper 56 at 76. The upper end of the bellows unit 44 is fixed between the mount 20 and the spring seat 22. The bellows unit 44 can be molded at any angle relative to the jounce bumper 56, but is preferably molded at an angle which places no stress on the subassembly at rest.

Figure 9:
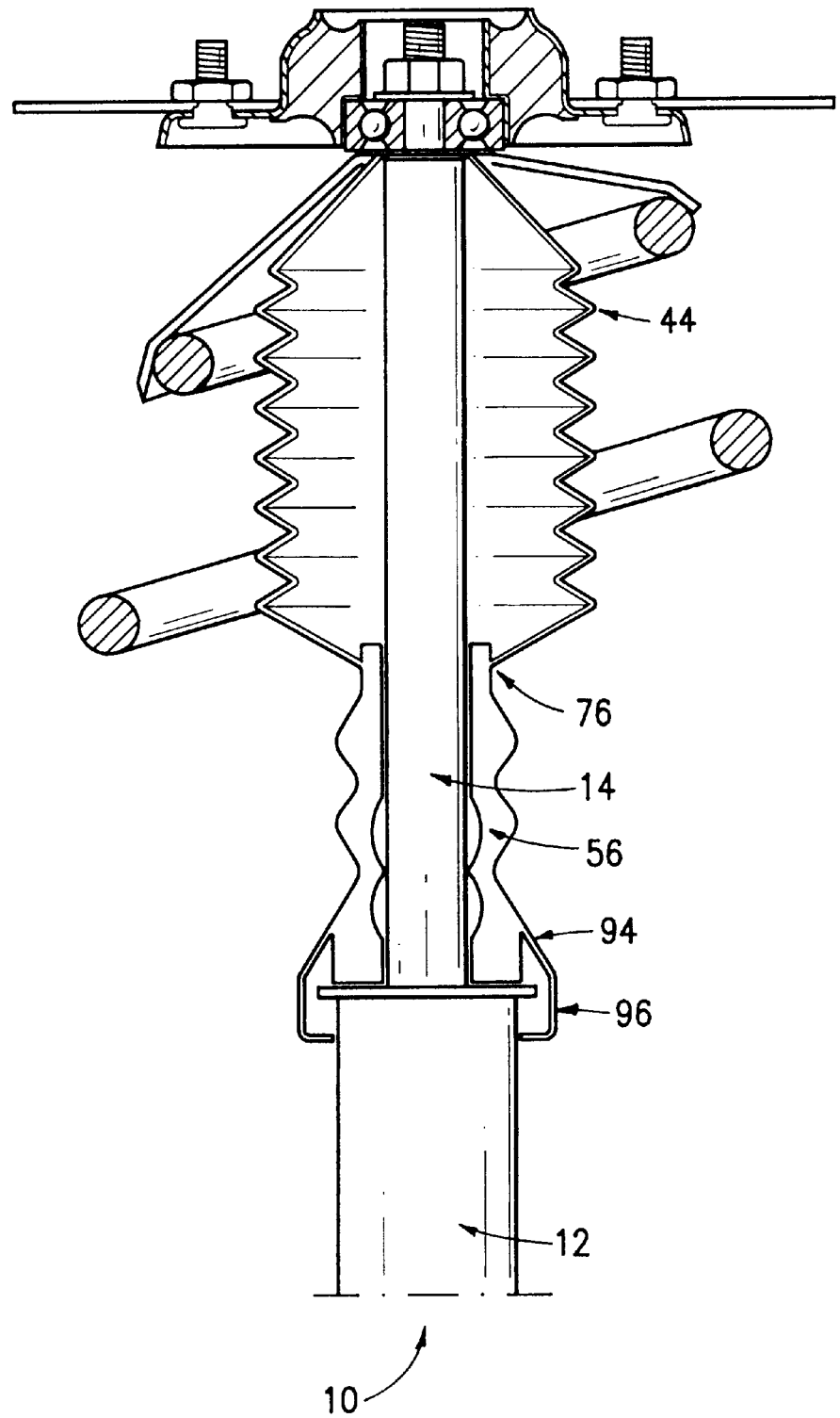
FIG. 9 is a longitudinal sectional view of the present subassembly, where the subassembly including the jounce bumper is free-floating, illustrating an embodiment of the present bumper-bellows subassembly having a tubular boot integrally molded to the lower end portion of the jounce bumper where the jounce bumper and the boot are in cooperation with the reservoir tube of the damper.

FIG. 9 is similar to FIG. 8, and illustrates an embodiment where provided on the bottom end portion of the jounce bumper 56 is a tubular boot 96 integrally molded with the jounce bumper at 94. The tubular boot is shown with straight sidewalls, but any shape sidewall is intended, i.e., convoluted as in the bellows 44, curved, rippled, etc.

Figure 10:
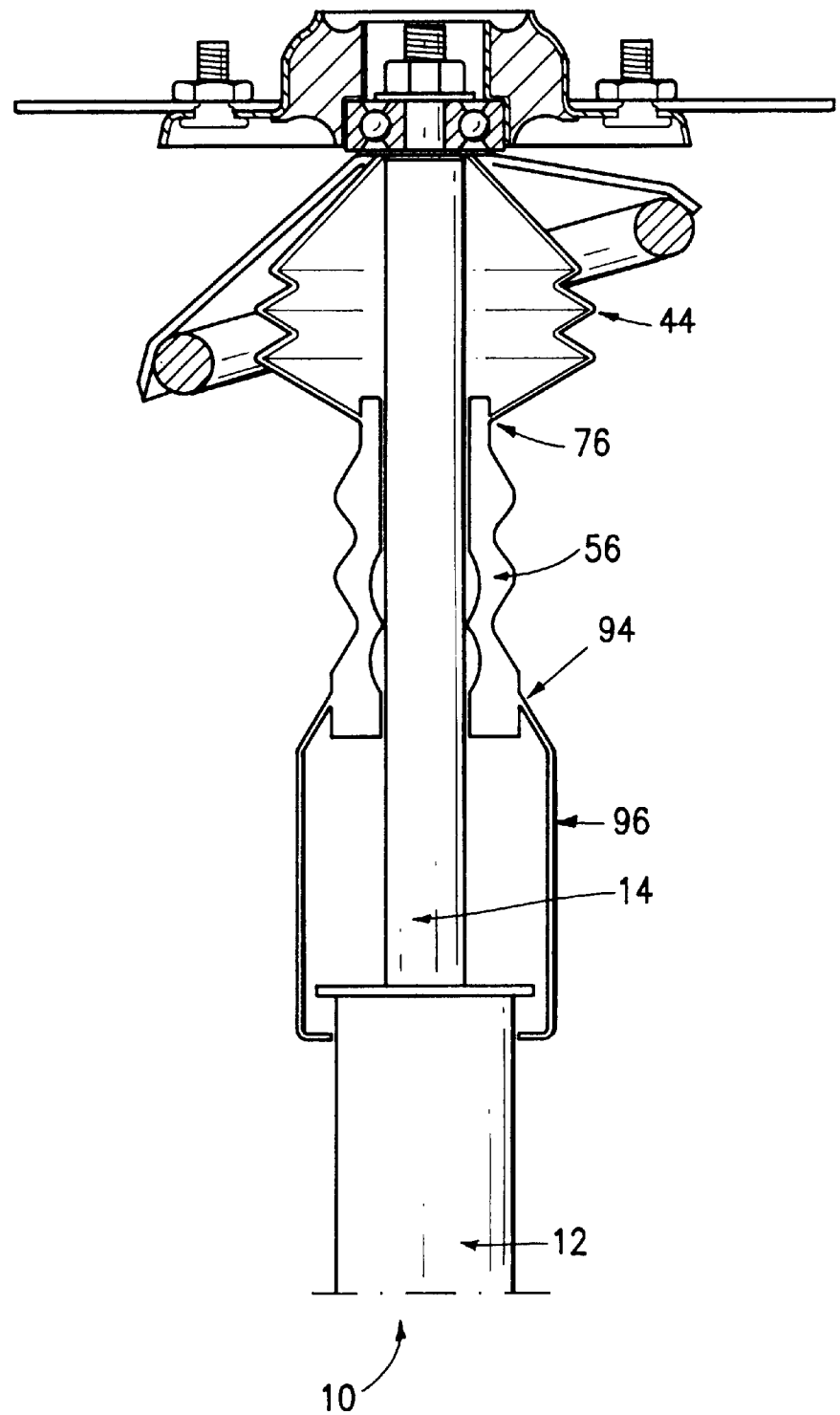
FIG. 10 is a longitudinal sectional view of the present subassembly, where the subassembly including the jounce bumper is free-floating, illustrating an embodiment of the present invention having a tubular boot with the boot being in cooperation with the reservoir tube of the bellows, when the system is at rest.

FIG. 10 is similar to FIG. 9 and shows an embodiment where the jounce bumper 56 is disposed between the bellows 44 integrally molded at 76, and the tubular boot 96 integrally molded at 94. The sidewalls of the tubular boot may be of any shape including straight, convoluted, rippled, curved, etc.

Now having described the invention, it will be understood by those of skill in the art that the scope may be performed within a wide and equivalent range of conditions, parameters and the like, without affecting the spirit or scope of the invention or of any embodiment thereof.

What is claimed is:

1. A bumper-bellows subassembly, comprising:
   an elastic tubular bellows;
   a jounce bumper comprising an elastic sleeve; and
   a tubular boot,
   wherein said elastic tubular bellows, said jounce bumper and said tubular boot are integrally molded such that said jounce bumper is disposed between said elastic tubular bellows and said tubular boot.

2. The subassembly of claim 1, wherein a bottom end of said elastic tubular bellows is integrally molded to a top end of said jounce bumper and a bottom end of said jounce bumper is integrally molded to a top end of said tubular boot.

3. A damper device, comprising:
   a cylinder;
   a piston rod in slidable communication with said cylinder;
   a jounce bumper comprising an elastic sleeve in frictional communication with said piston rod;
   an elastic tubular bellows integrally molded to said jounce bumper to form a one-piece subassembly having a jounce bumper end and a bellows end said bellows end slidably connected to said cylinder, and
   one or more leak detection orifices provided on a bottom portion of said bellows end of said one-piece subassembly.

4. A one-piece jounce bumper and bellows subassembly for use with a damper, comprising:
   a jounce bumper comprising an elastic sleeve;
   an elastic tubular bellows having an end integrally molded with a first end of said jounce bumper; and
   one or more leak detection orifices provided on said bellows in order to detect leaks in the case of damper failure,
   wherein a second end of said jounce bumper is frictionally fit to said piston rod of said damper and said subassembly functions as both a jounce bumper and a bellows.

5. A one-piece jounce bumper and bellows subassembly for use with a damper, comprising:
   a jounce bumper comprising an elastic sleeve;
   an elastic tubular bellows having an end integrally molded with a first end of said jounce bumper; and
   an integrally molded elastic collar provided on a bottom edge of said bellows the elastic collar being in contact with the cylinder and slidably connected thereto,
   wherein a second end of said jounce bumper is frictionally fit to said piston rod of said damper and said subassembly functions as both a jounce bumper and a bellows.

6. The damper device of claim 5, further comprising an integrally molded elastomeric skirt provided on a bottom edge of said integrally molded elastic collar.

7. A one-piece jounce bumper and bellows subassembly for use with a damper, comprising:
   a jounce bumper comprising an elastic sleeve;
   an elastic tubular bellows having an end integrally molded with a first end of said jounce bumper; and
   an integrally molded cinch collar provided on a bottom edge of said bellows,
   wherein a second end of said jounce bumper is frictionally fit to said piston rod of said damper and said subassembly functions as both a jounce bumper and a bellows.

8. The damper device of claim 7, wherein said cinch collar comprises an integrally molded elastomeric strap.

9. The damper device of claim 7, further comprising an integrally molded elastomeric skirt provided on a bottom edge of said cinch collar.

10. A damper device, comprising:

a cylinder;

a piston rod in slidable communication with said cylinder;

a jounce bumper comprising an elastic sleeve;

an tubular bellows integrally molded to said jounce bumper to form an integrally molded one-piece subassembly having a bellows end and a jounce bumper end; and one or more leak detection orifices provided on a bottom end portion of said bellows in order to detect leaks in the case of damper failure, wherein said jounce bumper end of said subassembly is frictionally fit to said piston rod, and said bellows end of said subassembly is slidably connected to said cylinder.

11. A damper device, comprising:

a cylinder;

a piston rod in slidable communication with said cylinder;

a jounce bumper comprising an elastic sleeve;

an tubular bellows integrally molded to said jounce bumper to form an integrally molded one-piece subassembly having a bellows end and a jounce bumper end; and an integrally molded elastic collar provided on a bottom edge of said bellows the elastic collar being in contact with the cylinder and slidably connected thereto, wherein said jounce bumper end of said subassembly is frictionally fit to said piston rod, and said bellows end of said subassembly is slidably connected to said cylinder.

12. The damper device of claim 11, further comprising an integrally molded elastomeric skirt provided on a bottom edge of said integrally molded elastic collar.

13. A damper device, comprising:

a cylinder;

a piston rod in slidable communication with said cylinder;

a jounce bumper comprising an elastic sleeve;

an tubular bellows integrally molded to said jounce bumper to form an integrally molded one-piece subassembly having a bellows end and a jounce bumper end; and an integrally molded cinch collar provided on a bottom edge of said bellows, wherein said jounce bumper end of said subassembly is frictionally fit to said piston rod, and said bellows end of said subassembly is slidably connected to said cylinder.

14. The damper device of claim 13, wherein said cinch collar comprises an integrally molded elastomeric strap.

15. The damper device of claim 13, further comprising an integrally molded elastomeric skirt provided on a bottom edge of said cinch collar.

16. A one-piece jounce bumper and bellows subassembly for use with a damper, comprising:

a jounce bumper comprising an elastic sleeve;

an elastic tubular bellows having a first end integrally molded with said jounce bumper; and one or more leak detection orifices provided on a bottom end portion of said bellows in order to detect leaks in the case of damper failure, wherein a second end of said elastic tubular bellows is slidably connected to a top end of a cylinder of said damper.

17. A one-piece jounce bumper and bellows subassembly for use with a damper, comprising:

a jounce bumper comprising an elastic sleeve;

an elastic tubular bellows having a first end integrally molded with said jounce bumper; and an integrally molded elastic collar provided on a bottom edge of said bellows the elastic collar being in contact with the cylinder and slidably connected thereto, wherein a second end of said elastic tubular bellows is slidably connected to a top end of a cylinder of said damper.

18. The subassembly of claim 17, further comprising an integrally molded elastomeric skirt provided on a bottom edge of said integrally molded elastic collar.

19. A one-piece jounce bumper and bellows subassembly for use with a damper, comprising:

a jounce bumper comprising an elastic sleeve;

an elastic tubular bellows having a first end integrally molded with said jounce bumper; and an integrally molded cinch collar provided on a bottom edge of said bellows, wherein a second end of said elastic tubular bellows is slidably connected to a top end of a cylinder of said damper.

20. The subassembly of claim 19, wherein said cinch collar comprises an integrally molded elastomeric strap.

21. The subassembly of claim 19, further comprising an integrally molded elastomeric skirt provided on a bottom edge of said cinch collar.

* * * * *